(12) United States Patent
Paul

(10) Patent No.: US 10,645,460 B2
(45) Date of Patent: May 5, 2020

(54) REAL-TIME SCRIPT FOR LIVE BROADCAST

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/851,102

(22) Filed: Dec. 21, 2017

(65) Prior Publication Data

US 2018/0192154 A1    Jul. 5, 2018

Related U.S. Application Data

(60) Provisional application No. 62/440,808, filed on Dec. 30, 2016.

(51) Int. Cl.
*H04N 21/488* (2011.01)
*G10L 15/26* (2006.01)
*H04N 21/2187* (2011.01)
*G06Q 50/00* (2012.01)
*H04N 21/2343* (2011.01)

(52) U.S. Cl.
CPC ......... *H04N 21/4884* (2013.01); *G06Q 50/01* (2013.01); *G10L 15/265* (2013.01); *H04N 21/2187* (2013.01); *H04N 21/234336* (2013.01)

(58) Field of Classification Search
CPC ....... H04N 21/2187; H04N 21/234336; H04N 21/4884; G06Q 50/01; G10L 15/265
See application file for complete search history.

(56) References Cited

U.S. PATENT DOCUMENTS

| | | | |
|---|---|---|---|
| 2009/0307227 A1* | 12/2009 | Prestenback | H04N 7/17318 |
| 2014/0002736 A1* | 1/2014 | Kaushal | H04N 7/088 348/468 |
| 2016/0027431 A1* | 1/2016 | Kurzweil | G06F 3/04842 715/203 |
| 2016/0062970 A1* | 3/2016 | Sadkin | G06F 17/212 715/233 |
| 2016/0173738 A1* | 6/2016 | Jones | H04H 20/38 715/719 |
| 2018/0070026 A1* | 3/2018 | Nussbaum | H04N 5/272 |

* cited by examiner

*Primary Examiner* — Nicholas T Corbo
(74) *Attorney, Agent, or Firm* — Baker Botts L.L.P.

(57) ABSTRACT

In one embodiment, a method includes retrieving, from one or more data stores, a script including multiple text strings, where the script is associated with a user of a social-networking system. The method also includes capturing an incoming media stream including audio data corresponding to vocal expression by the user, where the media stream is transmitted to the social-networking system for broadcast and identifying, using a speech recognition process, one or more words in the vocal expression corresponding to a text string of the script. The method also includes providing the corresponding text string for display in conjunction with a subsequent text string of the script.

18 Claims, 12 Drawing Sheets

REAL-TIME SCRIPT FOR LIVE BROADCAST

PRIORITY

This application claims the benefit, under 35 U.S.C. § 119(e), of U.S. Provisional Patent Application No. 62/440,808, filed 30 Dec. 2016, which is incorporated herein by reference.

TECHNICAL FIELD

This disclosure generally relates to presenting text in a user interface displayed on a user's client device.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, the social-networking system may provide a script associated with a live-broadcast session for display on a client system associated with a broadcasting user. In particular embodiments, the social-networking system may implement a live-broadcast service allowing a user to broadcast a media stream to one or more other users. The live-broadcast service may distribute the media stream in a live-broadcast session that allows one or more viewing users to react to the media stream and communicate with the broadcasting user in real time. This may create, for the viewing users, a sense of presence at a "scene" associated with the live broadcast session or a feeling of being at the same time and place as the broadcasting user.

In particular embodiments, the media stream may be in video or audio formats. It may be captured by a client system associated with the broadcasting user in real time. The media stream may comprise audio data corresponding to vocal expressions (e.g., speeches, conversations, songs) made by the broadcasting user. In particular embodiments, the broadcasting user may desire to view a pre-composed script in making the vocal expressions, which may remind the user about, for example, the language to use for a speech or the lyrics of a song. In particular embodiments, the media stream may further comprise video data associated with the broadcasting user. Specifically, the video data may comprise information about, for example, gestures or facial expressions of the user. In particular embodiments, the social-networking system may provide a script associated with the live-broadcast session for display on the client system associated with the broadcasting user to aid the user in making the vocal expressions. This functionality may allow the user to deliver a live broadcast with the aid of a prepared script using a single device and to read the script while looking in the direction of an I/O device capturing a video of the user.

In particular embodiments, the live-broadcast service may comprise a script-composing functionality allowing the user to compose a script in anticipation of a live-broadcast session. The script may then be stored in association with the user and be retrievable by the user. When the live-broadcast service receives a request from a client system associated with the user to initiate a live-broadcast session, it may prompt the user to select one or more scripts. A selected script may then be displayed in a user interface associated with the live-broadcast session to aid the user in delivering the live broadcast. The live-broadcast service may select a portion of the script for display to the user at a particular time. This displayed portion of the script may be selected and updated based on the progress of the live-broadcast session as determined by the client system associated with the broadcasting user.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
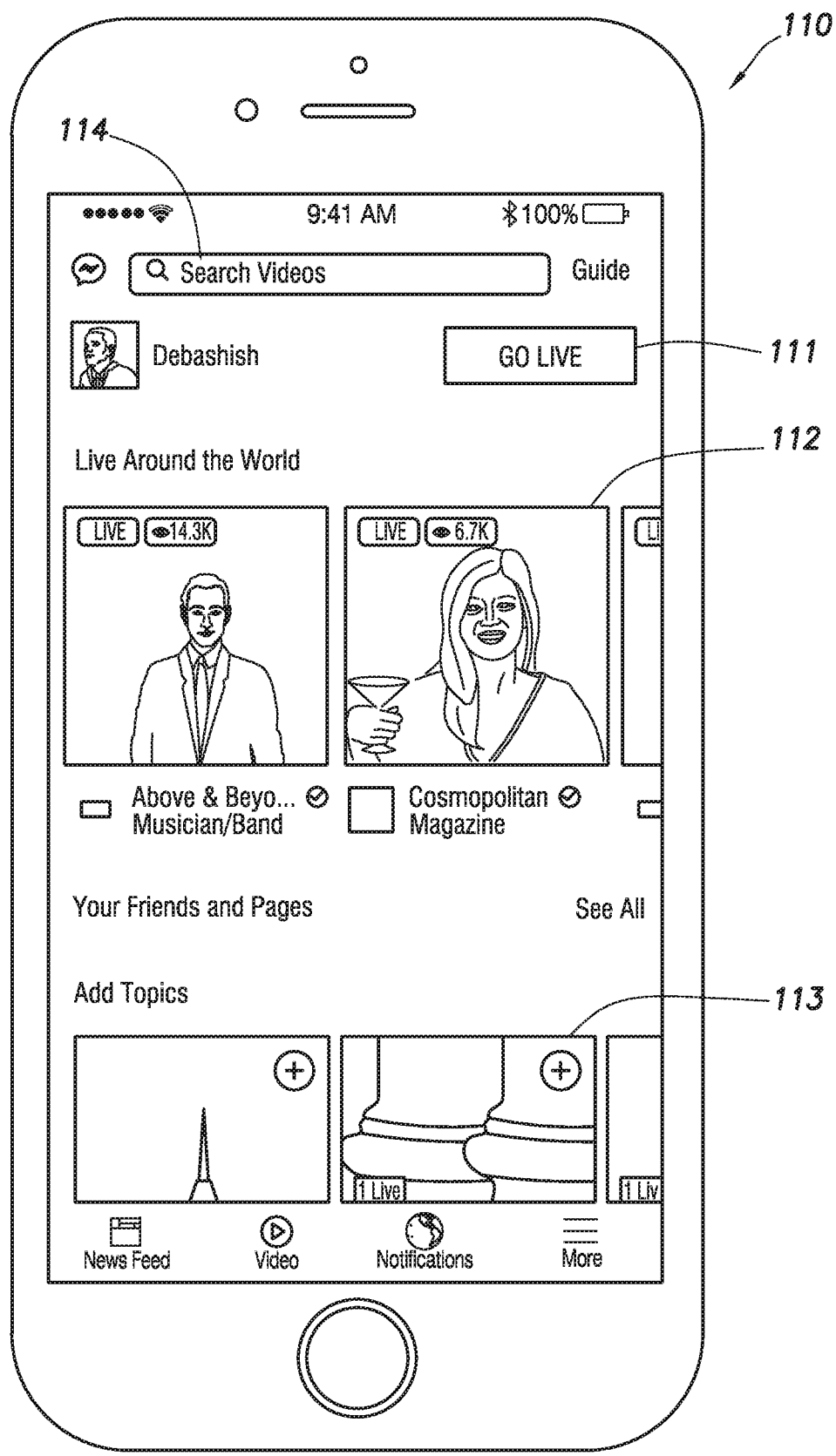
FIG. 1A illustrates an example home interface associated with a live-broadcast service.

In particular embodiments, the social-networking system may provide a script associated with a live-broadcast session for display on a client system associated with a broadcasting user. In particular embodiments, the social-networking system may implement a live-broadcast service allowing a user to broadcast a media stream to one or more other users. The live-broadcast service may distribute the media stream in a live-broadcast session that allows one or more viewing users to react to the media stream and communicate with the broadcasting user in real time. This may create, for the viewing users, a sense of presence at a "scene" associated with the live broadcast session or a feeling of being at the same time and place as the broadcasting user.

In particular embodiments, the media stream may be in video or audio formats. It may be captured by a client system associated with the broadcasting user in real time. The media stream may comprise audio data corresponding to vocal expressions (e.g., speeches, conversations, songs) made by the broadcasting user. In particular embodiments, the broadcasting user may desire to view a pre-composed script in making the vocal expressions, which may remind the user about, for example, the language to use for a speech or the lyrics of a song. In particular embodiments, the media stream may further comprise video data associated with the broadcasting user. Specifically, the video data may comprise information about, for example, gestures or facial expressions of the user. In particular embodiments, the social-networking system may provide a script associated with the live-broadcast session for display on the client system associated with the broadcasting user to aid the user in making the vocal expressions. This functionality may allow the user to deliver a live broadcast with the aid of a prepared script using a single device and to read the script while looking in the direction of an I/O device capturing a video of the user.

In particular embodiments, the live-broadcast service may comprise a script-composing functionality allowing the user to compose a script in anticipation of a live-broadcast session. The script may then be stored in association with the user and be retrievable by the user. When the live-broadcast service receives a request from a client system associated with the user to initiate a live-broadcast session, it may prompt the user to select one or more scripts. A selected script may then be displayed in a user interface associated with the live-broadcast session to aid the user in delivering the live broadcast. The live-broadcast service may select a portion of the script for display to the user at a particular time. This displayed portion of the script may be selected and updated based on the progress of the live-broadcast session as determined by the client system associated with the broadcasting user.

In particular embodiments, the social-networking system may implement a live-broadcast service allowing a user to broadcast a media stream to one or more other users. A client system associated with a user may send, to the social-networking system, information to initiate a live-broadcast session. In response to such information, the social-networking system may initiate the live-broadcast session and provide on the client system for display a corresponding user interface. In parallel, the social-networking system may send a notification associated with the live-broadcast session to one or more client systems associated with one or more potential viewing users. The client system associated with the broadcasting user may then capture a media stream associated with the user. The media stream may be captured by one or more I/O devices associated with the client system such as a microphone or a video camera. It may comprise, for example, video data or audio data associated with the user. The client system associated with the broadcasting user may send the captured media stream, a portion of the media stream, or a modified version of the media stream to the social-networking system. The social-networking system may deliver, over a network, the received media stream to one or more client systems associated with one or more users who have requested to access or view the live-broadcast session. The client systems associated with the viewing users may receive the viewing users' input of reaction information (e.g., likes, comments, emoticons) to the media stream and forward the reaction information to the client system associated with the broadcasting user.

In particular embodiments, the user interface provided for display on the client system of the broadcasting user may comprise information associated with the live-broadcast session, the broadcasting user, or one or more of the viewing users. As an example and not by way of limitation, the user interface may comprise a video field displaying a video stream captured by a camera associated with the client system, an audio visualization field displaying an animation of a video stream captured by a microphone associated with the client system, a reaction field displaying reaction information associated with one or more viewing users, a timer indicating a length of time that the current live-broadcast session is in place, a headcount icon indicating a number of users viewing the live broadcast, other information, or any combination thereof. Based on particular embodiments disclosed herein, the user interface may further comprise a script associated with the live-broadcast session. Although this disclosure describes providing a live-broadcast service in a particular manner, this disclosure contemplates providing a live-broadcast service in any suitable manner. More information on live-broadcast services may be found in U.S. patent application Ser. No. 15/395,583, filed 30 Dec. 2016, and U.S. patent application Ser. No. 15/395,597, filed 30 Dec. 2016, which are incorporated by reference.

FIG. 1A illustrates an example home interface associated with a live-broadcast service. In particular embodiments, a user may access the live-broadcast service via an application installed on a client system associated with the user. Alternatively, the user may access the live-broadcast service via a webpage displayed by a web browser associated with the client system associated with the user. In particular embodiments, the live-broadcast service may provide for display to the user a home interface 110. This home interface 110 may comprise a "GO LIVE" button 111. If the user clicks on or presses the "GO LIVE" button 111, the client system may start one or more processes corresponding to initiating a live-broadcast session and transfer the user to a preview interface 120. The home interface 110 may further comprise a list of live-broadcast sessions 112 that the user may access. It may further comprise a list of topics 113 (in terms of their graphic representations), which may be chosen by the user to access live broadcasts associated with particular topics. The home interface 110 may also comprise a search field 114 allowing the user to search for one or more live-broadcast sessions or video recordings of live-broadcast sessions. Although FIG. 1A illustrates a particular home interface associated with a live-broadcast service, this disclosure contemplates any suitable user interface associated with a live-broadcast service.

Figure 1B:
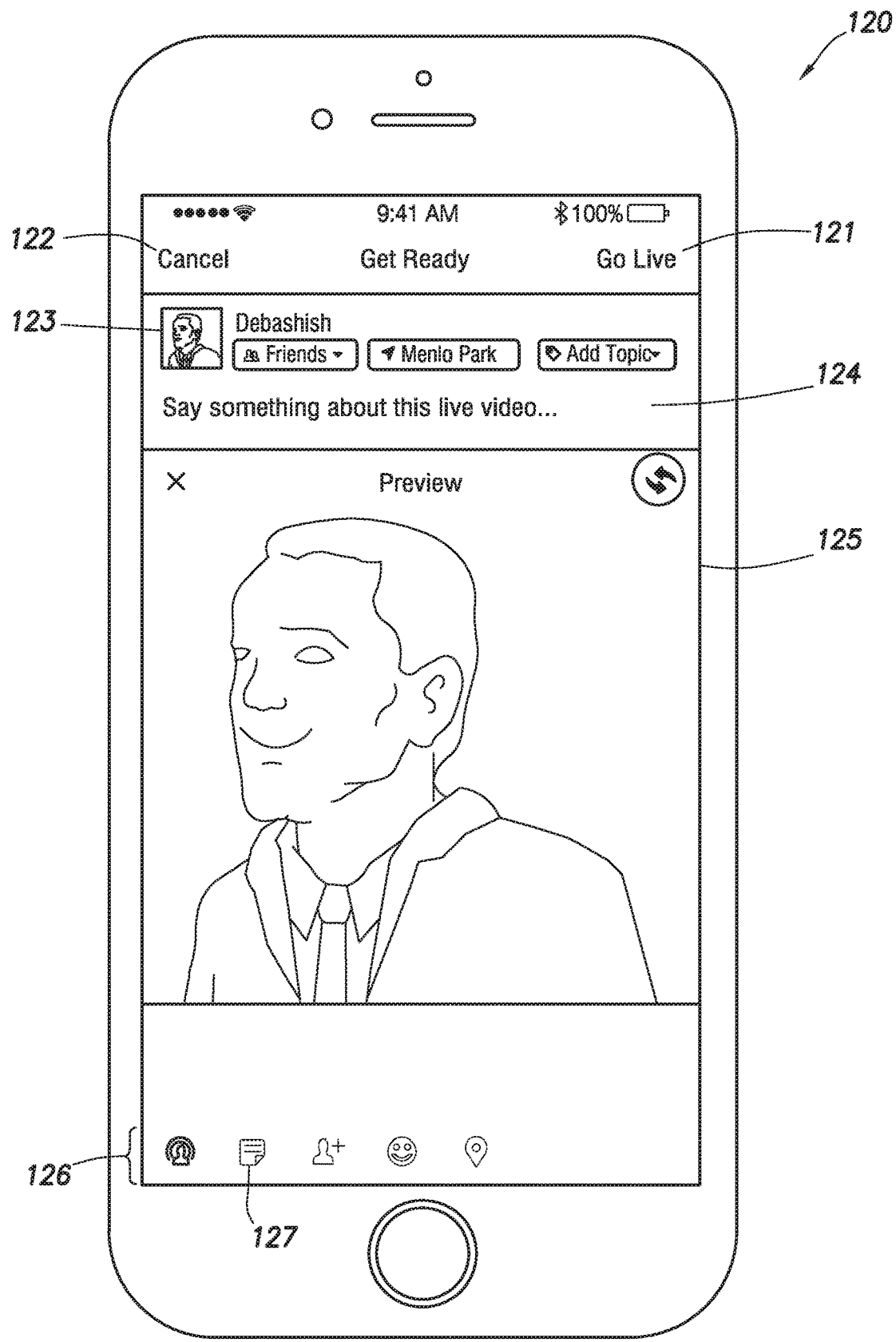
FIG. 1B illustrates an example preview interface associated with a live-broadcast service.

FIG. 1B illustrates an example preview interface associated with a live-broadcast service. In particular embodiments, the client system associated with the broadcasting user may provide to the user a preview interface 120 for display in response to a user input. As an example and not by way of limitation, the user input may comprise clicking on the "GO LIVE" button 111 in the home interface 110. At this stage, the client system may begin to capture a video stream associated with the user using a camera associated with the client system. The captured video stream may be displayed in a video field 125. This may help the broadcasting user to obtain an understanding about what viewing user will be able to see after the live-broadcast session starts. The preview interface 120 may comprise a profile picture 123 associated with the broadcasting user and a title field 124 allowing the user to enter a description about the upcoming live-broadcast session. The preview interface 120 may further comprise a "Go Live" button 121. If the user interacts with (e.g., clicks on) the "Go Live" button 121, the client system may send information to the social-networking system to initiate a live-broadcast session. The user may be transferred to a user interface associated with the live-broadcast (e.g., as shown in FIG. 1H). On the other hand, if the user interacts with the "Cancel" button 122, the live-broadcast service may cancel the current live-broadcast session and transfer the user back to the home interface 110. The preview interface 120 may further comprise a menu bar 126 representing one or more functionalities available to the user. In particular embodiments, the menu bar 126 may comprise a note icon 127 corresponding to a functionality allowing the user to access one or more scripts and use one or more of the scripts for the current live-broadcast session. Although FIG. 1B illustrates a particular preview interface associated with a live-broadcast service, this disclosure contemplates any suitable interface associated with a live-broadcast service allowing a user to preview a media stream captured by an I/O device.

In particular embodiments, the client system associated with the broadcasting user may retrieve a script associated with the broadcasting user from one or more data stores. The script may comprise a plurality of text strings. The script may have been generated by the broadcasting user. As an example and not by way of limitation, the live-broadcast service may comprise a script-composing functionality. Alternatively, the script-composing functionality may be provided by an independent text-editing program or application. The live-broadcast service may direct a broadcasting user to or from the text-editing program to create scripts. It may be configured to be compatible with file formats generated by the text-editing program.

In particular embodiments, the script-composing functionality may provide for display a user interface comprising a text-input field for the user to input text and create a script. The script-composing functionality may further comprise a speech recognition or speech-to-text service. This service may convert an audio stream captured by the client system into text and provide the generated text to the script-composing functionality. In particular embodiments, a script generated by a user may be saved in one or more data stores associated with the client system or the social-networking system. In particular embodiments, one or more scripts may not have been created by the user. Specifically, one or more of the scripts may have been uploaded to the social-networking system from the client system of the user, downloaded from a third-party website, or obtained from one or more content objects associated with the social-networking system.

In particular embodiments, the live-broadcast service may provide the broadcasting user access to one or more saved scripts from a user interface associated with a live-broadcast session. As an example and not by way of limitation, the user interface may comprise a button, when clicked on by a user, transfers the user to a user interface presenting one or more scripts. The broadcasting user may select one or more saved scripts for use in a live-broadcast session. Although this disclosure describes retrieving a script associated with the broadcasting user from one or more data stores in a particular manner, this disclosure contemplates retrieving a script associated with the broadcasting user from one or more data stores in any suitable manner.

Figure 1C:
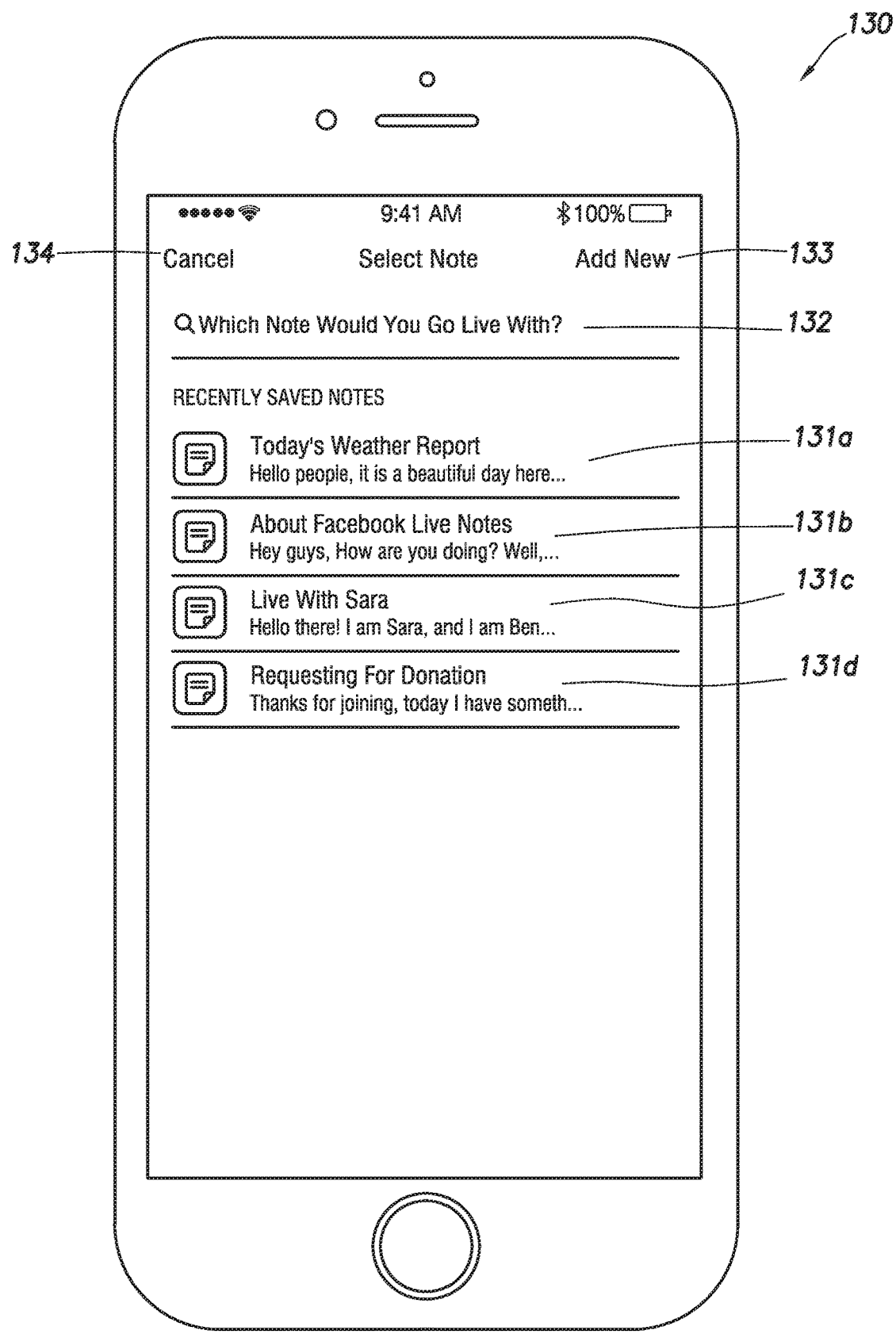
FIG. 1C illustrates an example script-selection interface associated with a live-broadcast service.

FIG. 1C illustrates an example script-selection interface associated with a live-broadcast service. In particular embodiments, the client system associated with the broadcasting user may provide the script-selection interface 130 for display to the user after detecting the user's interaction with the note icon 127 in the preview interface 120. The script-selection interface 130 may comprise one or more pre-generated scripts 131. The scripts 131 may be retrievable from one or more data stores associated with the client system or the social-networking system. The script-selection interface 130 may comprise a script search field 132 allowing the user to search for one or more pre-generated scripts 131. It may further comprise an "Add New" button 133. If the user interacts with the "Add New" button 133, the live-broadcast service may initiate the script-composing functionality and transfer the user to a user interface, within which the user may compose a script and save it to one or more data stores. A newly added script may appear in the script-selection interface 130 as one of the scripts 131. The broadcasting user may select one of the scripts 131 or choose to use a newly generated script. For example, the user may select to use the script entitled "About Facebook Live Notes" by clicking on or pressing the field 131*b*. The live-broadcast service may then provide for display to the user a user interface 140 comprising detailed information about the selected script. Alternatively, the user may click on or press the "Cancel" button 134 to cancel script selection and be transferred back to the preview interface 120. Although FIG. 1C illustrates a particular script-selection interface associated with a live-broadcast service, this disclosure contemplates any suitable interface for selecting a script or note associated with a live-broadcast service.

Figure 1D:
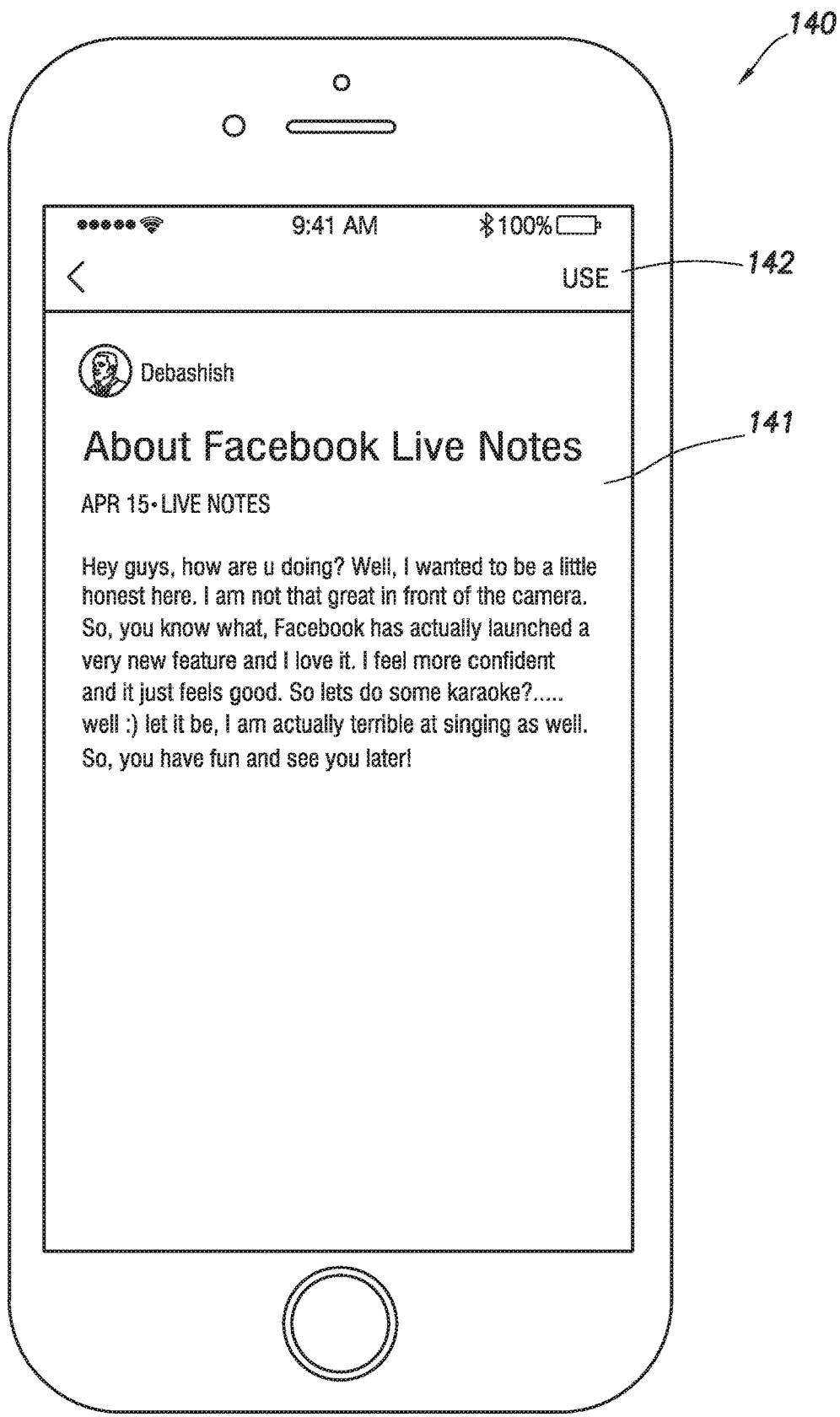
FIG. 1D illustrates an example script-information interface associated with a live-broadcast service.

FIG. 1D illustrates an example script-information interface associated with a live-broadcast service. In particular embodiments, after a script is selected by a broadcasting user, the live-broadcast service may provide for display a script-information interface 140 on a client system associated with the user. The script-information interface 140 may comprise information 141 describing the script comprising, for example, a name of the creator of the script, a title of the script, a creation time of the script, text of the script, other information about the script, or any combination thereof. In particular, the displayed information 141 may comprise one or more text strings associated with the script. The script-information interface 140 may further comprise a "USE" button 142. If the user interacts with the "USE" button 142, the script may be incorporated into a user interface associated with the upcoming live-broadcast session. Although FIG. 1D illustrates a particular script-information interface associated with a live-broadcast service, this disclosure contemplates any suitable interface displaying information associated with one or more scripts.

Figure 1E:
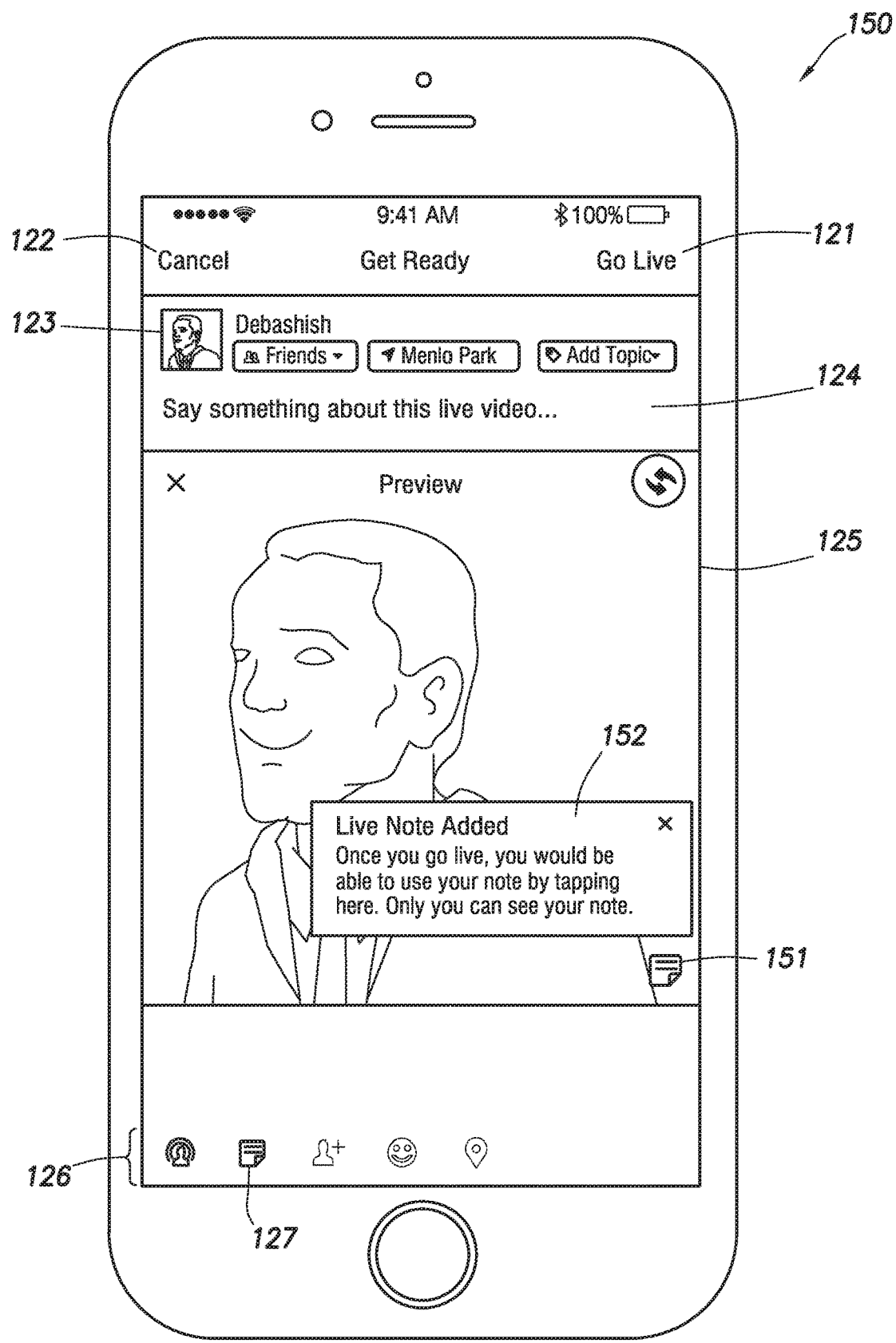
FIG. 1E illustrates an example preview interface associated with a live-broadcast service when a script has been selected.

FIG. 1E illustrates an example preview interface associated with a live-broadcast service when a script has been selected. In particular embodiments, after a script has been selected or newly generated by the broadcasting user, the live-broadcast service may provide the preview interface 150 for display on a client system associated with the user. This preview interface 150 may be largely similar to the preview interface 120 except that it additionally includes a script button 151 and a notice 152. The notice 152 may inform the broadcasting user that a script has been added to the upcoming live-broadcast session and that the user may interact with the script button 151 to view the script. When the user interacts with the script button 151, the live-broadcast service may provide a user interface comprising at least part of the added script. Although FIG. 1E illustrates a particular preview interface associated with a live-broadcast service when a script has been added, this disclosure contemplates any suitable interface associated with a live-broadcast service comprising information about a script.

In particular embodiments, the client system associated with the user may capture an incoming media stream comprising audio data corresponding to vocal expression by the user. The media stream may be transmitted to the social-networking system for broadcast. In particular embodiments, the client system may send information to the social-networking system to initiate a live-broadcast session in response to a user input. As an example and not by way of limitation, the user input may comprise an interaction with the "Go Live" button 121 in the preview interface 150. Based on information received from the client system, the social-networking system may initiate a live-broadcast session and provide for display on the client system a user interface associated with the live-broadcast session. In particular embodiments, after a live-broadcast session has been initiated, the client system associated with the broadcasting user may capture an incoming media stream in association with the live-broadcast session. The client system my capture the incoming media stream using one or more I/O devices (e.g., video camera, microphone). The one or more I/O devices may be integrated in the client system or be independent and connected to the client system. The incoming media stream may comprise, for example, audio data, video data, other suitable data, or any combination thereof.

In particular embodiments, the broadcasting user may make vocal expressions in front of a camera associated with the client system or otherwise in proximity to the client system. The vocal expressions may comprise, for example, a speech made by the user, an oral presentation given by the user, or a song sung by the user. The user may make the vocal expressions based on a script provided for display according to particular embodiments described herein. The vocal expressions may be captured by an I/O device associated with the client system and recorded as audio data that constitute at least a component of the media stream.

In particular embodiments, the client system associated with the broadcasting user may generate an outgoing media stream based on the incoming media stream. The outgoing media stream may be in the same format as or identical to the incoming media steam. Alternatively, the outgoing media stream may comprise part of the incoming media stream. As an example and not by way of limitation, for an incoming media stream comprising both audio and video data, the client system may generate a second media stream by removing the video data and retaining the audio data. In this case, the outgoing media stream may be an audio stream.

In particular embodiments, the client system associated with the broadcasting user may send the outgoing media stream to the social-networking system. The social-networking system may then distribute the received media stream to one or more client systems associated with one or more viewing users in real time. The viewing users may have requested access to the live-broadcast session. Additionally or alternatively, the social-networking system may buffer the received media stream before distributing it to the client systems associated with the viewing users. In particular embodiments, the client system associated with the broadcasting user may directly send the outgoing media stream to one or more client systems associated with one or more viewing users based on instructions received from the social-networking system. In particular embodiments, the live-broadcast service may allow media streams associated with more than one broadcasting users to be distributed to one or more viewing users in a particular live-broadcast session. Although this disclosure describes capturing an incoming media stream in a particular manner, this disclosure contemplates capturing an incoming media stream in any suitable manner.

In particular embodiments, the client system associated with the broadcasting user may identify one or more words in the vocal expression corresponding to a text string of the script. The words may be identified using a speech recognition process. The speech recognition process may analyze audio data associated with the vocal expression that are stored or buffered by the client system or analyze the audio data in real time as the data is captured by the client system. The audio data may be at least part of the media stream captured by the client system during a live-broadcast session. The speech recognition process may comprise one or more acoustic models or language models. The models may have been trained by data obtained from the social-networking system (e.g., user posts, shared audio recordings) or from one or more third-party databases. The speech recognition process may employ one or more techniques or algorithms in the fields of machine learning or big data to train the models or analyze audio data. In particular embodiments, the identification of words from audio data corresponding to vocal expressions may involve inaccuracies. The inaccuracies may be reduced or eliminated by comparing one or more identified words with a script added to a live-broadcast session. Specifically, it may be presumed that at least part of a vocal expression made by a broadcasting user is consistent with a script selected by the user. A word actually appearing in the script may be presumed to be more likely to be pronounced by the user than a word that does not appear in the script.

In particular embodiments, the live-broadcast service may compare one or more words identified by the speech recognition process with one or more text strings of the script selected by the user and added to the live-broadcast session in order to identify matches between the vocal expression and the script. As an example and not by way of limitation, the speech recognition process may analyze audio data captured during a live-broadcast session to identify the words "had," "chicken," "and," "waffle," and "today." The live-broadcast service may compare one or more of the identified words with one or more text strings of a script selected by the user. It may determine that the identified words match the text string "I had chicken and waffles today for lunch" in the script. Here, the live-broadcast service may or may not require exact match between the identified words and the text string. The live-broadcast service may use one or more fuzzy logic algorithms to perform the matching given that the speech recognition process or even the user's recitation of the script may be inaccurate. Although this disclosure describes identifying one or more words in a vocal expression corresponding to a text string of a script in a particular manner, this disclosure contemplates identifying one or more words in a vocal expression corresponding to a text string of a script in any suitable manner.

In particular embodiments, the client system associated with the broadcasting user may provide the text string that corresponds to one or more of the identified words for display in conjunction with a subsequent text string of the script. In particular embodiments, there may not be sufficient space within a user interface associated with a live-broadcast session to display an entire script. It may also be unnecessary for the broadcasting user to read the entire script at the same time. The broadcasting user may only desire to view a portion of the script containing text strings that the user is about to recite and the context of the text strings that the user is reciting. In particular embodiments, the live-broadcast service may choose to provide for display a portion of the script that the user is likely to be interested in. It may update the portion of the script that is displayed based on the progress of the live-broadcast session.

In particular embodiments, the live-broadcast service may provide for display a portion of the script in a user interface associated with a live-broadcast session in a manner that is easily readable and non-distracting for the broadcasting user. The appearance of portions of the script in the user interface may be controlled to distinguish text corresponding to what the user has said, text corresponding to what the user is saying or is predicted to say soon, and text corresponding to what the user is predicted to not say for a while. In particular embodiments, the live-broadcast service may make the text corresponding to what the user is saying or is about to say clear and noticeable and make other text blurry, light, or obscured. As an example and not by way of limitation, the live-broadcast service may provide the matching text string and the subsequent text string for display in conjunction with instructions to emphasize the subsequent text string. The subsequent test string may be emphasized as being bold, italicized, highlighted, color coded, etc. Alternatively, the matching text string and other portions of the script may be made light, blurry, obscured, small, etc. to emphasize the subsequent text string. As another example and not by way of limitation, the matching text string and the subsequent text string of the script may be provided for display in a scrolling format. Specifically, a portion of the script including the text strings may be presented in a scrolling box in the user interface associated with the live-broadcast session. The live-broadcast service may scroll down the text contained in the scroll box as the user speaks or sings such that the text displayed or highlighted matches the user's vocal expression. The live-broadcast service may pause the scrolling if the user stops to make any vocal expression corresponding to the script.

In particular embodiments, the live-broadcast service may modify the appearance of the text displayed in the user interface associated with the live-broadcast session based on user preferences. As an example and not by way of limitation, a field displaying a portion of the script may occupy an entire displayable area or a part of the displayable area. The size of the field may be adjustable. As another example and not by way of limitation, the displayed text may have adjustable size, font, color, etc. Although this disclosure describes providing the text string that corresponds to one or more of the identified words for display in conjunction with a subsequent text string of the script in a particular manner, this disclosure contemplates providing the text string that corresponds to one or more of the identified words for display in conjunction with a subsequent text string of the script in any suitable manner.

In particular embodiments, the live-broadcast service may calculate, based on a retrieved script and a captured incoming media stream, an estimated length of time of the user to finish the script. It may then provide for display a representation of the calculated length of time. In particular embodiments, the broadcasting user may desire to know how long it would take to complete a live broadcast. The live-broadcast service may predict this length of time based at least in part on the script that the user has selected with the assumption that the user would finish the live-broadcast session when she finishes reading the script. As an example and not by way of limitation, the live-broadcast service may determine a percentage of the script's text that the broadcasting user has finished and a length of time taken by the user. The live-broadcast service may then determine a percentage of the remaining part of the script and predict the length of time remaining based on the speed of the user in making a vocal expression. Although this disclosure describing calculating and providing for display a representation of an estimated length of time to finish a script in a particular manner, this disclosure contemplates calculating and providing for display a representation of an estimated length of time to finish a script in any suitable manner.

Figure 1F:
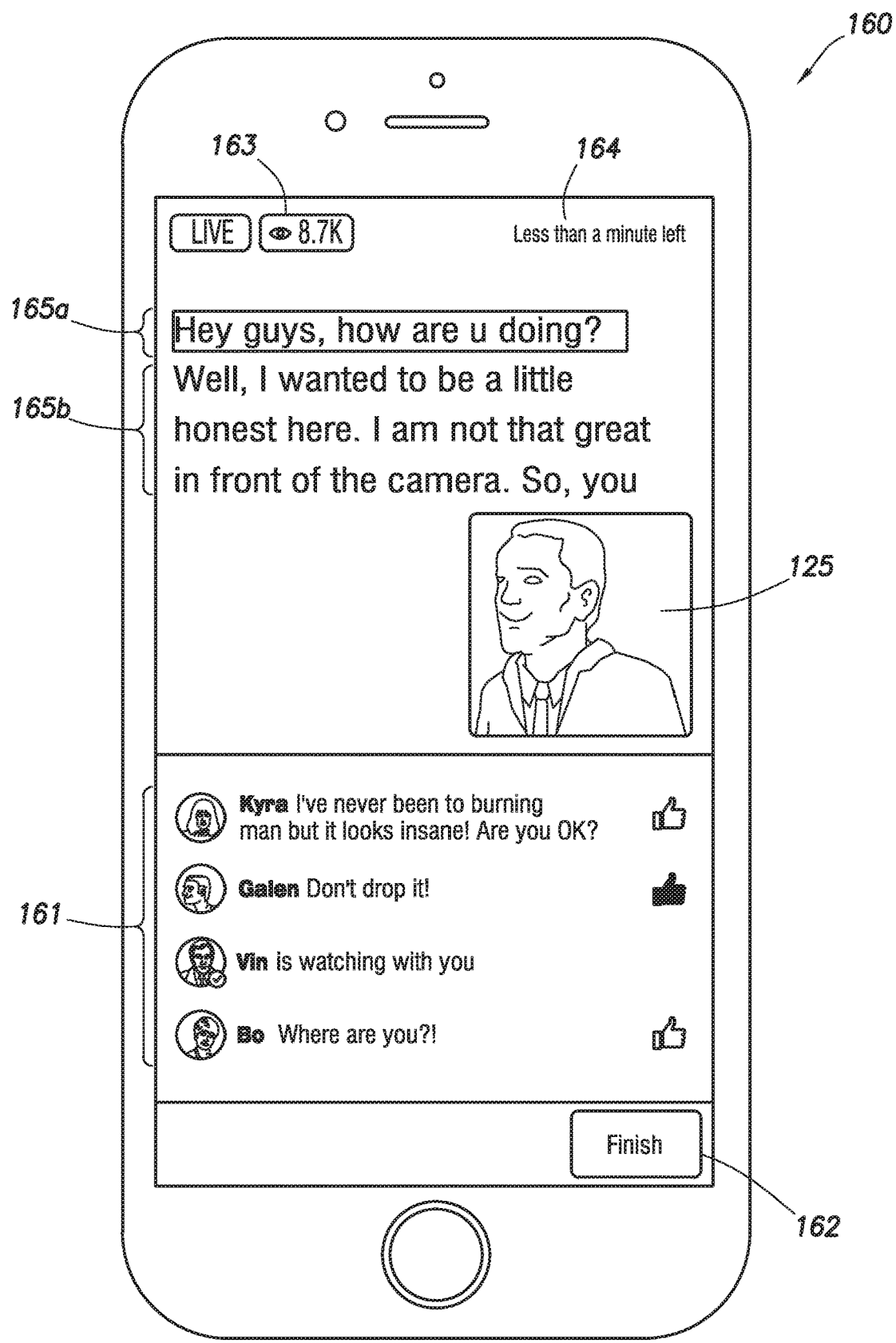
FIGS. 1F-1H illustrate example live-broadcast interfaces associated with a live-broadcast session.

FIGS. 1F-1I1 illustrate example live-broadcast interfaces associated with a live-broadcast session. In particular embodiments, the live-broadcast service may initiate a live-broadcast session and provide for display a live-broadcast interface. As shown in FIG. 1F, a client system associated with the broadcasting user may provide for display a live-broadcast interface 160. The live-broadcast interface 160 may comprise a video field 125 displaying a video stream currently captured by an I/O device associated with the client system. The live-broadcast interface may further comprise a reaction information field 161 displaying reaction information to the live broadcast received from one or more client systems associated with one or more viewing users. The reaction information may comprise one or more comments, likes, status indicators, emoticons, other information, or any combination thereof. The live-broadcast interface 160 may further comprise a headcount icon 163 indicating a number of viewing users currently accession the live-broadcast session and a time indicator 164 indicating an estimated length of time remaining to finish the current live broadcast.

In particular embodiments, the broadcasting user may have selected a pre-generated script to add to the live-broadcast session. In particular embodiments, the live-broadcast interface 160 may comprise one or more text strings 165 of the selected script. The live-broadcast service may have analyzed audio data associated with a media stream captured by the client system associated with the broadcasting user to identify one or more words in a vocal expression by the user. The live-broadcast service may then identify a text string of the script corresponding to one or more of the identified words. As an example and not by way of limitation, as shown on FIG. 1F, the live-broadcast service may determine that audio data captured based on a recent vocal expression by the broadcasting user comprises one or more words corresponding to an initial text string 165a of the script "Hey guys, how are u doing." The live-broadcast service may thereby provide for display in the live-broadcast interface 160 the text string 165a in conjunction with a subsequent text string 165b. It is expected that, if the broadcasting user proceeds through the script in order, she would read the subsequent text string 165b right after. The live-broadcast service may distinguish text that has been read by the broadcasting user 165a and text to be read by the broadcasting user 165b by, for example, applying a rectangular border to the former. As illustrated by FIG. 1F, the field displaying a portion of the script 165 may occupy part of the live-broadcast interface 160. Within the live-broadcast interface 160, the broadcasting user may interact with the "Finish" button 162 to terminate the live-broadcast session.

Figure 1G:
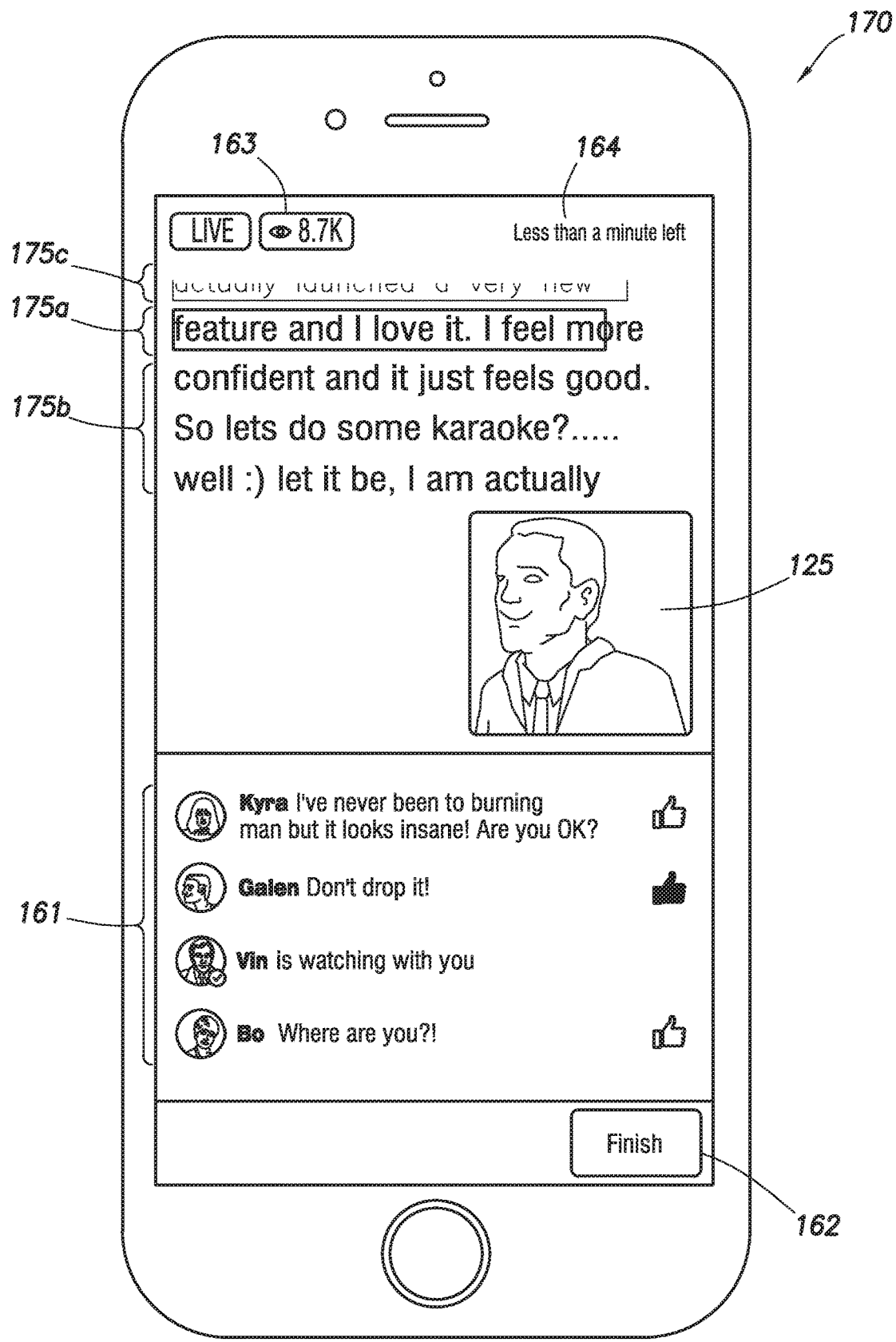
Figure 1H:
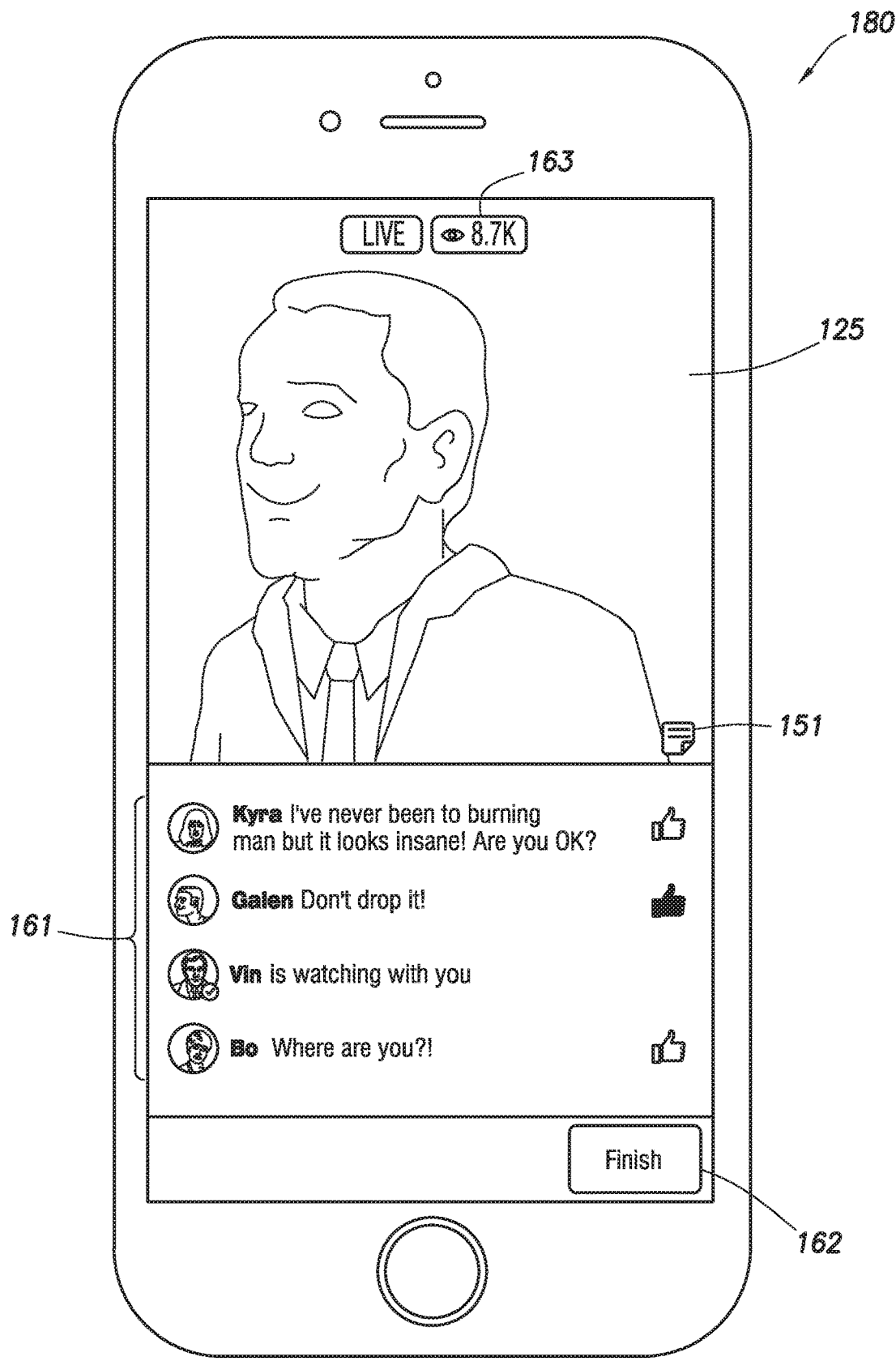

In particular embodiments, the live-broadcast service may scroll down the displayed text as the broadcasting user proceeds through the added script. As shown in FIG. 1G, the live-broadcast service may determine that one or more words identified from audio data most recently captured based on the broadcasting user's vocal expression match the text string "feature and I love it . . . I feel more" 175a in the added script. The live-broadcast service may provide for display in a live-broadcast interface 170 the text string 175a as well as a subsequent test string 175b. As the displayed script is scrolling down, the text string 175c, which has been expressed by the user, may fade away. The live-broadcast service may de-emphasize the text string 175c by making the text lighter and emphasize the text strings 175a and 175b.

In particular embodiments, the broadcasting user may interact with one or more elements in the live-broadcast interface to minimize the script or remove it from the interface. As shown in FIG. 1I1, the script may have been minimized or removed from the live-broadcast interface 180. The video field 125 may be enlarged to take over the space previously assigned to display portions of the script. The live-broadcast interface 180 may comprise the script button 151. The broadcasting user may interact with the script button 151 to bring the script back to the live-broadcast interface. Although FIGS. 1F-1H illustrate particular live-broadcast interfaces associated with a live-broadcast session, this disclosure contemplates any suitable live-broadcast interfaces associated with a live-broadcast session.

In particular embodiments, the client system associated with the broadcasting user may send a selected script to the social-networking system for display in a web interface associated with the broadcasting user. In particular embodiments, the live-broadcast service may provide the broadcasting user a choice as to whether to make the script available to one or more of the viewing users or one or more other users. If the broadcasting user elects to share the script with one or more other users, the script may be posted, for example, on a timeline associated with the broadcasting user's account on the social-networking system. In particular embodiments, the script may be provided in conjunction with a record of its corresponding live-broadcast session in a web interface. It may alternatively or additionally be used to generate captions for the record of the live-broadcast session. Although this disclosure describes sending a script to the social-networking system for display in a web interface in a particular manner, this disclosure contemplates sending a script to the social-networking system for display in a web interface in any suitable manner.

Figure 2:
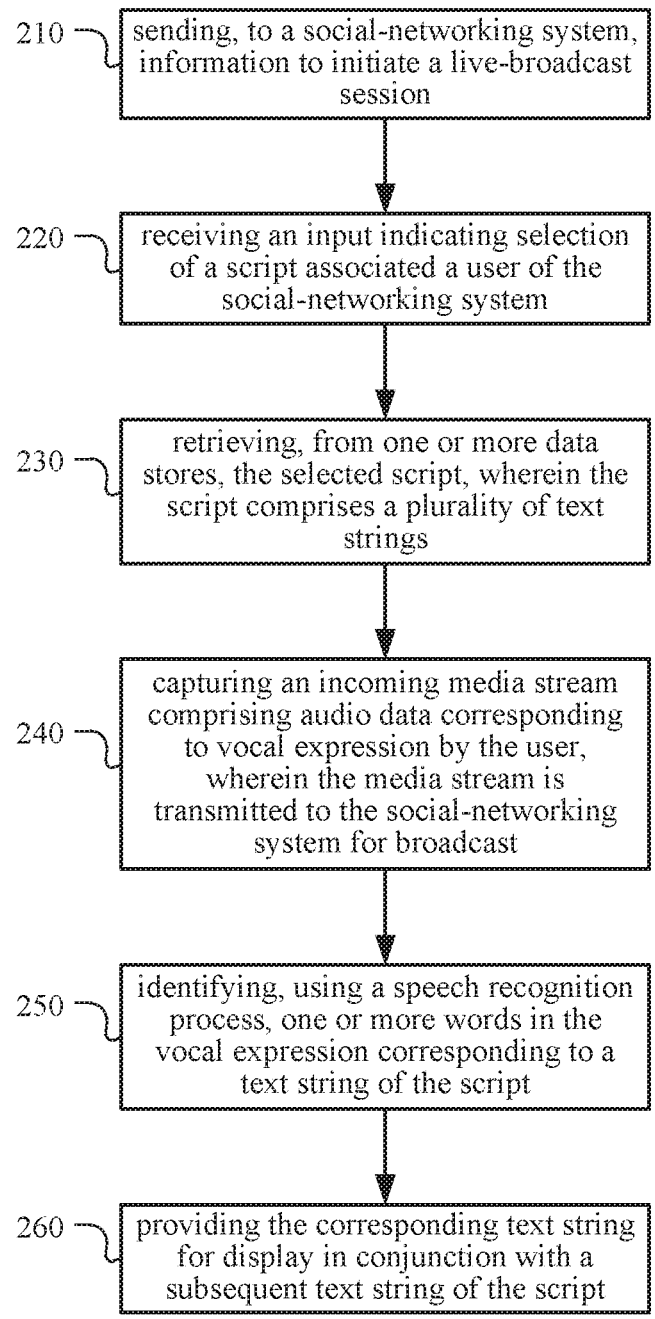
FIG. 2 illustrates an example method for providing a script associated with a live-broadcast session for display on a client system associated with a broadcasting user.

FIG. 2 illustrates an example method 200 for providing a script associated with a live-broadcast session for display on a client system associated with a broadcasting user. The method may begin at step 210, where the client system may send, to a social-networking system, information to initiate a live-broadcast session. At step 220, the client system may receive an input indicating selection of a script associated a user of the social-networking system. At step 230, the client system may retrieve, from one or more data stores, the selected script, wherein the script comprises a plurality of text strings. At step 240, the client system may capture an incoming media stream comprising audio data corresponding to vocal expression by the user, wherein the media stream is transmitted to the social-networking system for broadcast. At step 250, the client system may identify, using a speech recognition process, one or more words in the vocal expression corresponding to a text string of the script. At step 260, the client system may provide the corresponding text string for display in conjunction with a subsequent text string of the script. Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for providing a script associated with a live-broadcast session for display on a client system associated with a broadcasting user including the particular steps of the method of FIG. 2, this disclosure contemplates any suitable method for providing a script associated with a live-broadcast session for display on a client system associated with a broadcasting user including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

System Overview

Figure 3:
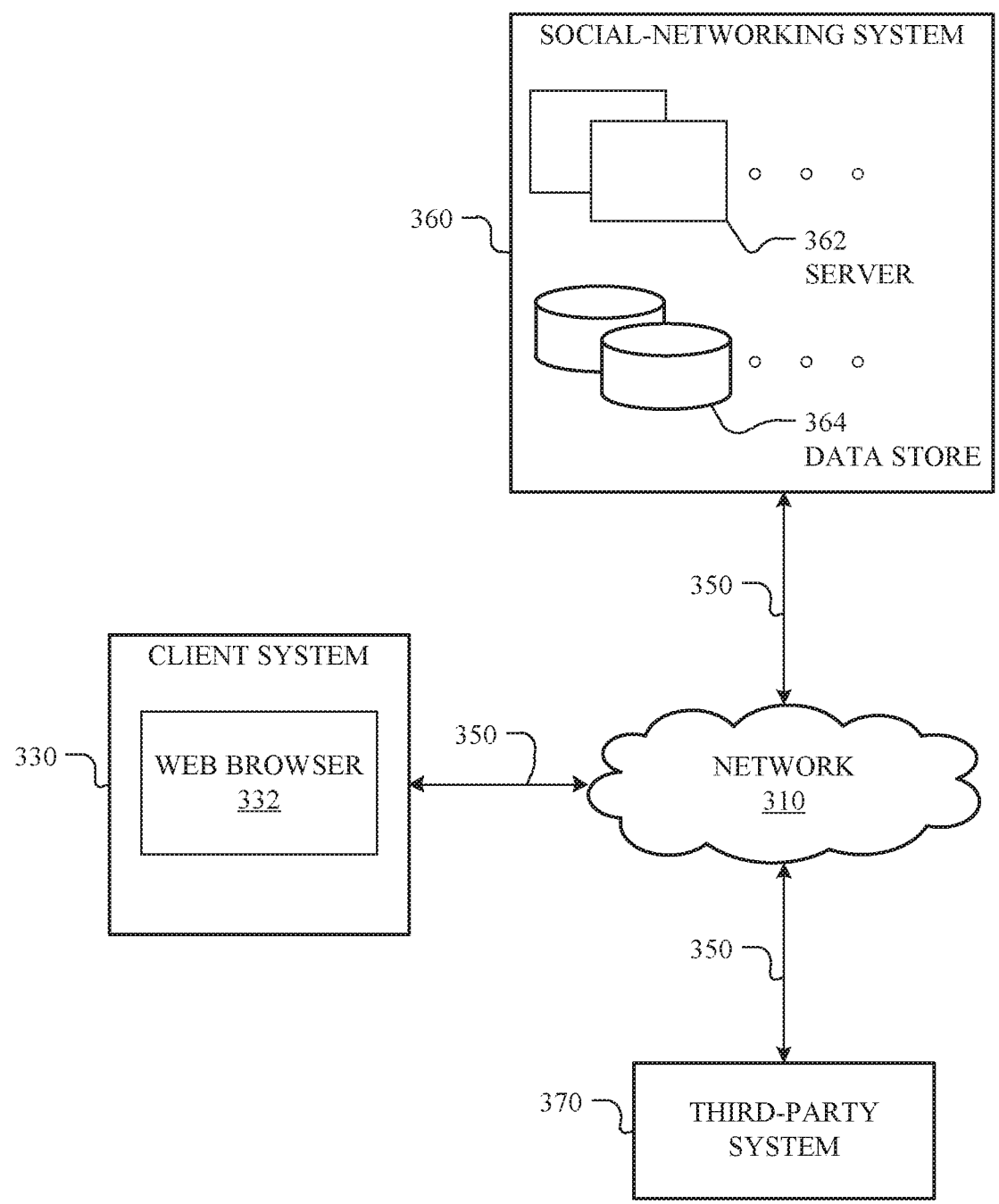
FIG. 3 illustrates an example network environment associated with a social-networking system.

FIG. 3 illustrates an example network environment 300 associated with a social-networking system. Network environment 300 includes a client system 330, a social-networking system 360, and a third-party system 370 connected to each other by a network 310. Although FIG. 3 illustrates a particular arrangement of client system 330, social-networking system 360, third-party system 370, and network 310, this disclosure contemplates any suitable arrangement of client system 330, social-networking system 360, third-party system 370, and network 310. As an example and not by way of limitation, two or more of client system 330, social-networking system 360, and third-party system 370 may be connected to each other directly, bypassing network 310. As another example, two or more of client system 330, social-networking system 360, and third-party system 370 may be physically or logically co-located with each other in whole or in part. Moreover, although FIG. 3 illustrates a particular number of client systems 330, social-networking systems 360, third-party systems 370, and networks 310, this disclosure contemplates any suitable number of client systems 330, social-networking systems 360, third-party systems 370, and networks 310. As an example and not by way of limitation, network environment 300 may include multiple client system 330, social-networking systems 360, third-party systems 370, and networks 310.

This disclosure contemplates any suitable network 310. As an example and not by way of limitation, one or more portions of network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 310 may include one or more networks 310.

Links 350 may connect client system 330, social-networking system 360, and third-party system 370 to communication network 310 or to each other. This disclosure contemplates any suitable links 350. In particular embodiments, one or more links 350 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout network environment 300. One or more first links 350 may differ in one or more respects from one or more second links 350.

In particular embodiments, client system 330 may be an electronic device including hardware, software, or embedded logic components or a combination of two or more such components and capable of carrying out the appropriate functionalities implemented or supported by client system 330. As an example and not by way of limitation, a client system 330 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 330. A client system 330 may enable a network user at client system 330 to access network 310. A client system 330 may enable its user to communicate with other users at other client systems 330.

In particular embodiments, client system 330 may include a web browser 332, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 330 may enter a Uniform Resource Locator (URL) or other address directing the web browser 332 to a particular server (such as server 362, or a server associated with a third-party system 370), and the web browser 332 may generate a Hyper Text Transfer Protocol (HTTP) request and communicate the HTTP request to server. The server may accept the HTTP request and communicate to client system 330 one or more Hyper Text Markup Language (HTML) files responsive to the HTTP request. Client system 330 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 360 may be a network-addressable computing system that can host an online social network. Social-networking system 360 may generate, store, receive, and send social-networking data, such as, for example, user-profile data, concept-profile data, social-graph information, or other suitable data related to the online social network. Social-networking system 360 may be accessed by the other components of network environment 300 either directly or via network 310. As an example and not by way of limitation, client system 330 may access social-networking system 360 using a web browser 332, or a native application associated with social-networking system 360 (e.g., a mobile social-networking application, a messaging application, another suitable application, or any combination thereof) either directly or via network 310. In particular embodiments, social-networking system 360 may include one or more servers 362. Each server 362 may be a unitary server or a distributed server spanning multiple computers or multiple datacenters. Servers 362 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 362 may include hardware, software, or embedded logic components or a combination of two or more such components for carrying out the appropriate functionalities implemented or supported by server 362. In particular embodiments, social-networking system 360 may include one or more data stores 364. Data stores 364 may be used to store various types of information. In particular embodiments, the information stored in data stores 364 may be organized according to specific data structures. In particular embodiments, each data store 364 may be a relational, columnar, correlation, or other suitable database. Although this disclosure describes or illustrates particular types of databases, this disclosure contemplates any suitable types of databases. Particular embodiments may provide interfaces that enable a client system 330, a social-networking system 360, or a third-party system 370 to manage, retrieve, modify, add, or delete, the information stored in data store 364.

In particular embodiments, social-networking system 360 may store one or more social graphs in one or more data stores 364. In particular embodiments, a social graph may include multiple nodes—which may include multiple user nodes (each corresponding to a particular user) or multiple concept nodes (each corresponding to a particular concept)—and multiple edges connecting the nodes. Social-networking system 360 may provide users of the online social network the ability to communicate and interact with other users. In particular embodiments, users may join the online social network via social-networking system 360 and then add connections (e.g., relationships) to a number of other users of social-networking system 360 to whom they want to be connected. Herein, the term "friend" may refer to any other user of social-networking system 360 with whom a user has formed a connection, association, or relationship via social-networking system 360.

In particular embodiments, social-networking system 360 may provide users with the ability to take actions on various types of items or objects, supported by social-networking system 360. As an example and not by way of limitation, the items and objects may include groups or social networks to which users of social-networking system 360 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 360 or by an external system of third-party system 370, which is separate from social-networking system 360 and coupled to social-networking system 360 via a network 310.

In particular embodiments, social-networking system 360 may be capable of linking a variety of entities. As an example and not by way of limitation, social-networking system 360 may enable users to interact with each other as well as receive content from third-party systems 370 or other entities, or to allow users to interact with these entities through an application programming interfaces (API) or other communication channels.

In particular embodiments, a third-party system 370 may include one or more types of servers, one or more data stores, one or more interfaces, including but not limited to APIs, one or more web services, one or more content sources, one or more networks, or any other suitable components, e.g., that servers may communicate with. A third-party system 370 may be operated by a different entity from an entity operating social-networking system 360. In particular embodiments, however, social-networking system 360 and third-party systems 370 may operate in conjunction with each other to provide social-networking services to users of social-networking system 360 or third-party systems 370. In this sense, social-networking system 360 may provide a platform, or backbone, which other systems, such as third-party systems 370, may use to provide social-networking services and functionality to users across the Internet.

In particular embodiments, a third-party system 370 may include a third-party content object provider. A third-party content object provider may include one or more sources of content objects, which may be communicated to a client system 330. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 360 also includes user-generated content objects, which may enhance a user's interactions with social-networking system 360. User-generated content may include anything a user can add, upload, send, or "post" to social-networking system 360. As an example and not by way of limitation, a user communicates posts to social-networking system 360 from a client system 330. Posts may include data such as status updates or other textual data, location information, photos, videos, links, music or other similar data or media. Content may also be added to social-networking system 360 by a third-party through a "communication channel," such as a newsfeed or stream.

In particular embodiments, social-networking system 360 may include a variety of servers, sub-systems, programs, modules, logs, and data stores. In particular embodiments, social-networking system 360 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 360 may also include suitable components such as network interfaces, security mechanisms, load balancers, failover servers, management-and-network-operations consoles, other suitable components, or any suitable combination thereof. In particular embodiments, social-networking system 360 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 360 to one or more client systems 330 or one or more third-party system 370 via network 310. The web server may include a mail server or other messaging functionality for receiving and routing messages between social-networking system 360 and one or more client systems 330. An API-request server may allow a third-party system 370 to access information from social-networking system 360 by calling one or more APIs. An action logger may be used to receive communications from a web server about a user's actions on or off social-networking system 360. In conjunction with the action log, a third-party-content-object log may be maintained of user exposures to third-party-content objects. A notification controller may provide information regarding content objects to a client system 330. Information may be pushed to a client system 330 as notifications, or information may be pulled from client system 330 responsive to a request received from client system 330. Authorization servers may be used to enforce one or more privacy settings of the users of social-networking system 360. A privacy setting of a user determines how particular information associated with a user can be shared. The authorization server may allow users to opt in to or opt out of having their actions logged by social-networking system 360 or shared with other systems (e.g., third-party system 370), such as, for example, by setting appropriate privacy settings. Third-party-content-object stores may be used to store content objects received from third parties, such as a third-party system 370. Location stores may be used for storing location information received from client systems 330 associated with users. Advertisement-pricing modules may combine social information, the current time, location information, or other suitable information to provide relevant advertisements, in the form of notifications, to a user.

Social Graphs

Figure 4:
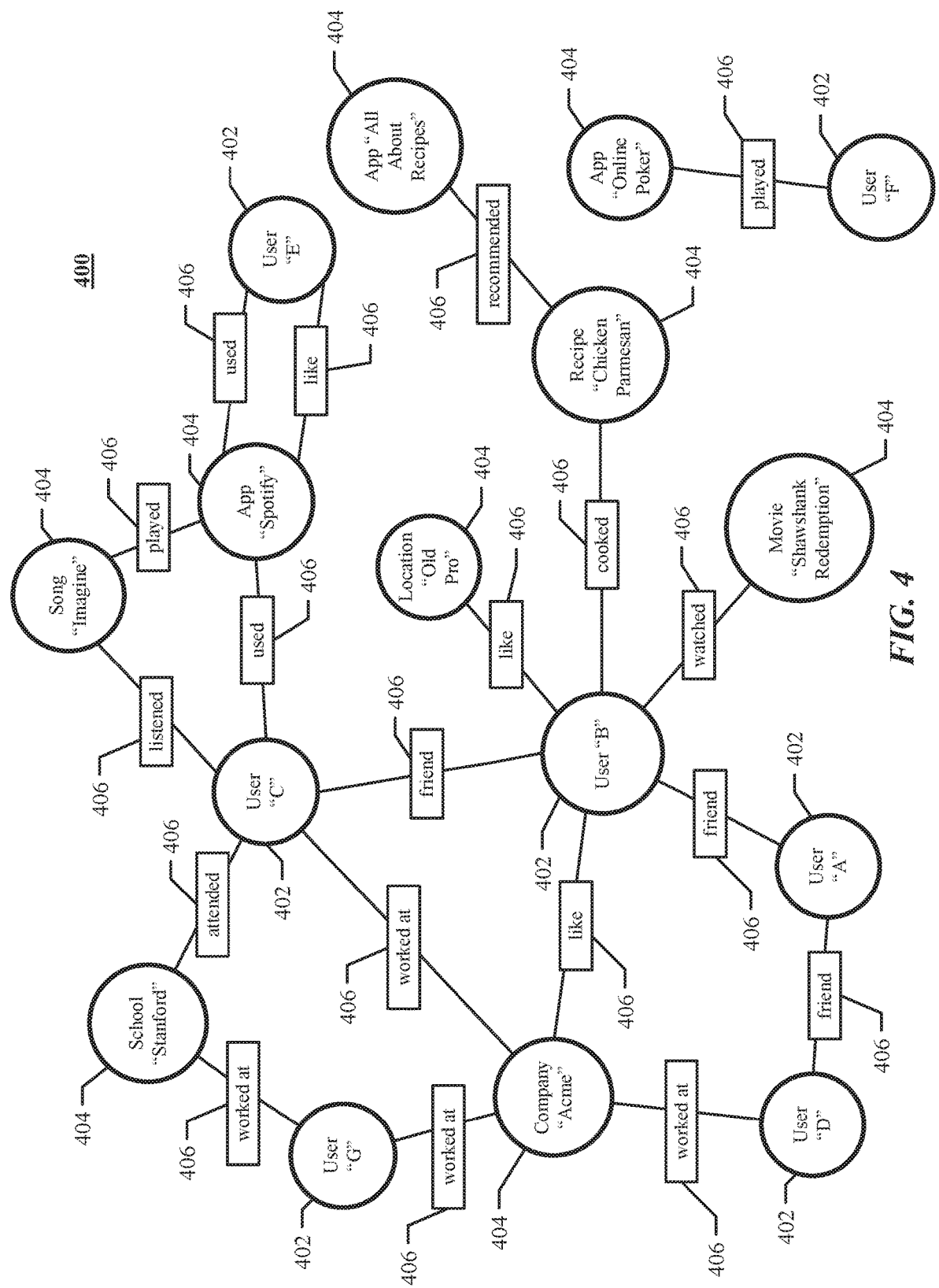
FIG. 4 illustrates an example social graph.

FIG. 4 illustrates example social graph 400. In particular embodiments, social-networking system 360 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 360, client system 330, or third-party system 370 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 360. As an example and not by way of limitation, a user may be an individual (human user), an entity (e.g., an enterprise, business, or third-party application), or a group (e.g., of individuals or entities) that interacts or communicates with or over social-networking system 360. In particular embodiments, when a user registers for an account with social-networking system 360, social-networking system 360 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 360. In particular embodiments, a user node 402 may be associated with information provided by a user or information gathered by various systems, including social-networking system 360. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 360 or a third-party website associated with a web-application server); an entity (such as, for example, a person, business, group, sports team, or celebrity); a resource (such as, for example, an audio file, video file, digital photo, text file, structured document, or application) which may be located within social-networking system 360 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 404 may be associated with information of a concept provided by a user or information gathered by various systems, including social-networking system 360. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 360. Profile pages may also be hosted on third-party websites associated with a third-party system 370. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 370. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 330 to send to social-networking system 360 a message indicating the user's action. In response to the message, social-networking system 360 may create an edge (e.g., a check-in-type edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 360 may send a "friend request" to the second user. If the second user confirms the "friend request," social-networking system 360 may create an edge 406 connecting the first user's user node 402 to the second user's user node 402 in social graph 400 and store edge 406 as social-graph information in one or more of data stores 364. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to an edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 360 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 360 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 360 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 360 may create an edge 406 between a user node 402 and a concept node 404 in social graph 400. As an example and not by way of limitation, a user viewing a concept-profile page (such as, for example, by using a web browser or a special-purpose application hosted by the user's client system 330) may indicate that he or she likes the concept represented by the concept node 404 by clicking or selecting a "Like" icon, which may cause the user's client system 330 to send to social-networking system 360 a message indicating the user's liking of the concept associated with the concept-profile page. In response to the message, social-networking system 360 may create an edge 406 between user node 402 associated with the user and concept node 404, as illustrated by "like" edge 406 between the user and concept node 404. In particular embodiments, social-networking system 360 may store an edge 406 in one or more data stores. In particular embodiments, an edge 406 may be automatically formed by social-networking system 360 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

Social Graph Affinity and Coefficient

In particular embodiments, social-networking system 360 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 370 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 360 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 360 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 360 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 360 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 360 may calculate a coefficient based on a user's actions. Social-networking system 360 may monitor such actions on the online social network, on a third-party system 370, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 360 may calculate a coefficient based on the user's actions with particular types of content. The content may be associated with the online social network, a third-party system 370, or another suitable system. The content may include users, profile pages, posts, news stories, headlines, instant messages, chat room conversations, emails, advertisements, pictures, video, music, other suitable objects, or any combination thereof. Social-networking system 360 may analyze a user's actions to determine whether one or more of the actions indicate an affinity for subject matter, content, other users, and so forth. As an example and not by way of limitation, if a user frequently posts content related to "coffee" or variants thereof, social-networking system 360 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 360 may calculate a coefficient based on the type of relationship between particular objects. Referencing the social graph 400, social-networking system 360 may analyze the number and/or type of edges 406 connecting particular user nodes 402 and concept nodes 404 when calculating a coefficient. As an example and not by way of limitation, user nodes 402 that are connected by a spouse-type edge (representing that the two users are married) may be assigned a higher coefficient than a user nodes 402 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 360 may determine that the user has a higher coefficient with respect to the first photo than the second photo because having a tagged-in-type relationship with content may be assigned a higher weight and/or rating than having a like-type relationship with content. In particular embodiments, social-networking system 360 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 360 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 400. As an example and not by way of limitation, social-graph entities that are closer in the social graph 400 (i.e., fewer degrees of separation) may have a higher coefficient than entities that are further apart in the social graph 400.

In particular embodiments, social-networking system 360 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 330 of the user). A first user may be more interested in other users or concepts that are closer to the first user. As an example and not by way of limitation, if a user is one mile from an airport and two miles from a gas station, social-networking system 360 may determine that the user has a higher coefficient for the airport than the gas station based on the proximity of the airport to the user.

In particular embodiments, social-networking system 360 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 360 may provide information that is relevant to user's interests and current circumstances, increasing the likelihood that they will find such information of interest. In particular embodiments, social-networking system 360 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 360 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 360 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 370 (e.g., via an API or other communication channel), or from another suitable system. In response to the request, social-networking system 360 may calculate the coefficient (or access the coefficient information if it has previously been calculated and stored). In particular embodiments, social-networking system 360 may measure an affinity with respect to a particular process. Different processes (both internal and external to the online social network) may request a coefficient for a particular object or set of objects. Social-networking system 360 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 404 corresponding to a particular photo may have a privacy setting specifying that the photo may only be accessed by users tagged in the photo and their friends. In particular embodiments, privacy settings may allow users to opt in or opt out of having their actions logged by social-networking system 360 or shared with other systems (e.g., third-party system 370). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 370, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 362 may be authorization/privacy servers for enforcing privacy settings. In response to a request from a user (or other entity) for a particular object stored in a data store 364, social-networking system 360 may send a request to the data store 364 for the object. The request may identify the user associated with the request and may only be sent to the user (or a client system 330 of the user) if the authorization server determines that the user is authorized to access the object based on the privacy settings associated with the object. If the requesting user is not authorized to access the object, the authorization server may prevent the requested object from being retrieved from the data store 364, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 5:
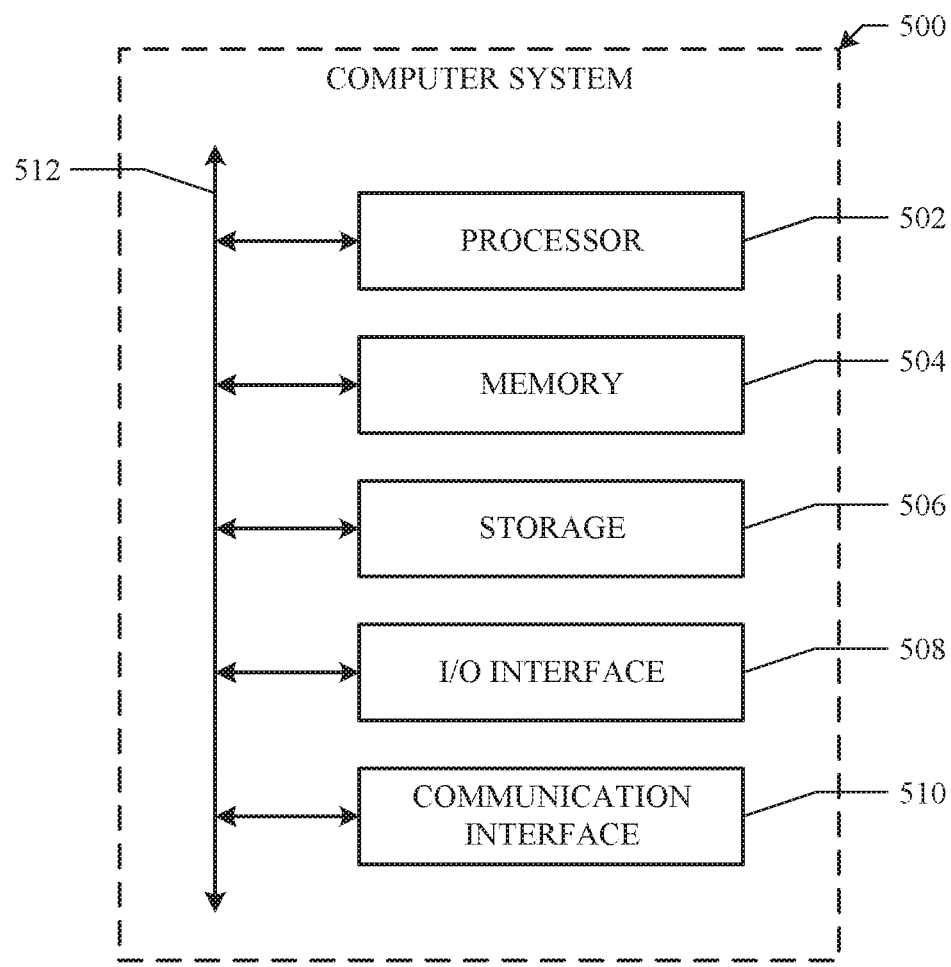
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a client system associated with a user:
    retrieving, from one or more data stores, a script comprising a plurality of text strings, wherein the script is associated with the user;
    capturing an incoming media stream comprising audio data corresponding to vocal expression by the user, wherein the media stream is transmitted for broadcast;
    identifying, using a speech recognition process, one or more words in the vocal expression corresponding to a text string of the script; and
    providing for display the corresponding text string, a subsequent text string of the script, and a reaction field, wherein the reaction field displays reaction information associated with one or more users viewing the media stream.

2. The method of claim 1, further comprising:
    receiving, at the client system, a script; and
    storing the script in the one or more data stores.

3. The method of claim 2, wherein the script was generated based on at least one captured audio stream.

4. The method of claim 1, wherein the corresponding text string and the subsequent text string of the script are provided for display in a scrolling format.

5. The method of claim 1, further comprising:
    calculating, based on the retrieved script and the captured incoming media stream, an estimated length of time for the user to finish the script; and
    providing for display a representation of the calculated length of time.

6. The method of claim 1, further comprising sending the script for display in a web interface associated with the user.

7. The method of claim 1, wherein the subsequent text string of the script is provided in conjunction with instructions to emphasize the subsequent text string.

8. One or more computer-readable non-transitory storage media embodying software that is operable when executed to:
    retrieve, from one or more data stores, a script comprising a plurality of text strings, wherein the script is associated with a user;
    capture an incoming media stream comprising audio data corresponding to vocal expression by the user, wherein the media stream is transmitted for broadcast;
    identify, using a speech recognition process, one or more words in the vocal expression corresponding to a text string of the script; and
    provide for display the corresponding text string, a subsequent text string of the script, and a reaction field, wherein the reaction field displays reaction information associated with one or more users viewing the media stream.

9. The media of claim 8, wherein the software is further operable when executed to:
    receive, at the client system, a script; and
    store the script in the one or more data stores.

10. The media of claim 9, wherein the script was generated based on at least one captured audio stream.

11. The media of claim 8, wherein the corresponding text string and the subsequent text string of the script are provided for display in a scrolling format.

12. The media of claim 8, wherein the software is further operable when executed to:
    calculate, based on the retrieved script and the captured incoming media stream, an estimated length of time for the user to finish the script; and
    provide for display a representation of the calculated length of time.

13. The media of claim 8, wherein the software is further operable when executed to send the script for display in a web interface associated with the user.

14. A system comprising: one or more processors; and a memory coupled to the processors comprising instructions executable by the processors, the processors being operable when executing the instructions to:
    retrieve, from one or more data stores, a script comprising a plurality of text strings, wherein the script is associated with a user;
    capture an incoming media stream comprising audio data corresponding to vocal expression by the user, wherein the media stream is transmitted for broadcast;

identify, using a speech recognition process, one or more words in the vocal expression corresponding to a text string of the script;

provide for display the corresponding text string, a subsequent text string of the script, and a reaction field, wherein the reaction field displays reaction information associated with one or more users viewing the media stream.

15. The system of claim 14, wherein the processors are further operable when executing the instructions to:
   receive, at the client system, a script; and
   store the script in the one or more data stores.

16. The system of claim 15, wherein the script was generated based on at least one captured audio stream.

17. The system of claim 14, wherein the corresponding text string and the subsequent text string of the script are provided for display in a scrolling format.

18. The system of claim 14, wherein the processors are further operable when executing the instructions to:
   calculate, based on the retrieved script and the captured incoming media stream, an estimated length of time for the user to finish the script; and
   provide for display a representation of the calculated length of time.

* * * * *